A. H. HUNT.
SELF ADJUSTING CLUTCH.
APPLICATION FILED DEC. 15, 1919.
1,422,062.
Patented July 4, 1922.
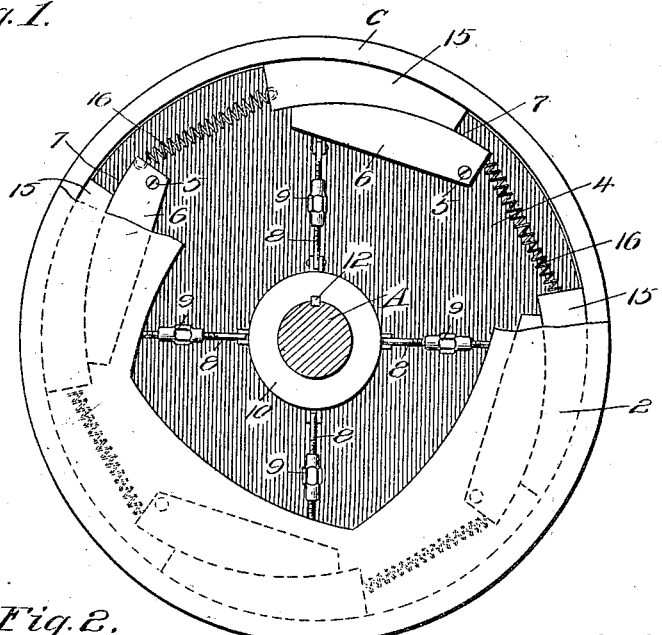
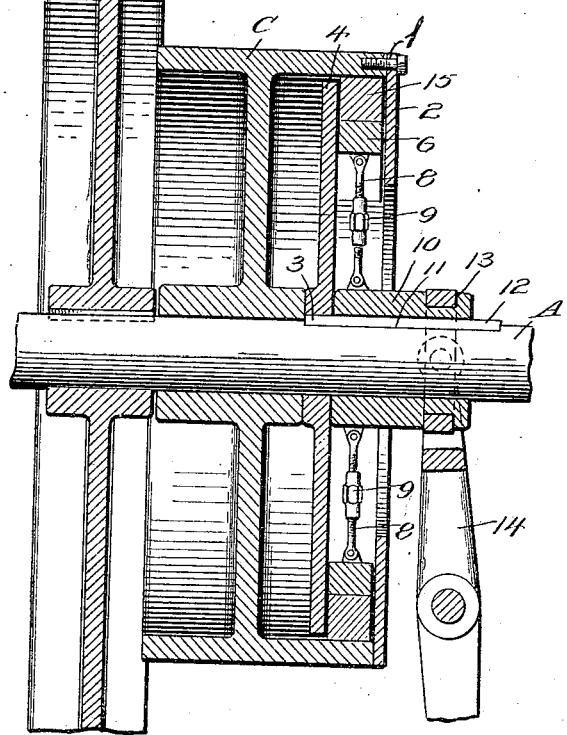
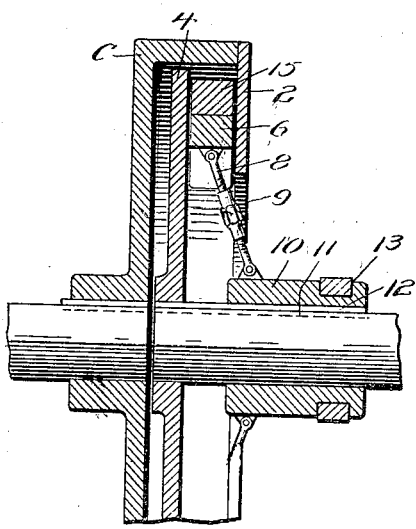
Inventor
Arthur H. Hunt.
By Geo. P. Kimmel
Attorney

UNITED STATES PATENT OFFICE.

ARTHUR H. HUNT, OF VIRGIL, KANSAS.

SELF-ADJUSTING CLUTCH.

1,422,062.  Specification of Letters Patent.  Patented July 4, 1922.

Application filed December 15, 1919. Serial No. 345,101.

*To all whom it may concern:*

Be it known that I, ARTHUR H. HUNT, a citizen of the United States, residing at Virgil, in the county of Greenwood and State of Kansas, have invented certain new and useful Improvements in a Self-Adjusting Clutch, of which the following is a specification.

This invention relates to friction clutches of the type designed for transmitting power from a drive shaft to a loose pulley or a driven shaft.

The principal objects of the invention are to provide a friction clutch of the type indicated which will automatically adjust itself to compensate for wear, to provide means for more rigidly locking or binding the clutch elements as the stress is increased and to provide means whereby relative automatic adjustability between the clutch elements will be effected to exert the maximum frictional contact between them to insure complete transmission of power from the drive shaft to the loose pulley or driven shaft.

With these and other objects in view which will appear as the nature of the invention is better understood, the invention comprises the novel features of construction and arrangement of parts, which will be more fully described hereinafter and set forth with particularity in the claims appended hereto.

In the drawings wherein the preferred embodiment of the invention is illustrated:

Figure 1 is a face view of the clutch mounted upon a drive shaft and operatively actuated with respect to a loose pulley, the plate being broken away to show the wedge and shoe elements effectively.

Figure 2 is a vertical section of the device; and Figure 3 is a fragmentary vertical section of the clutch shown applied for connecting a drive and a driven shaft, the clutch being in inoperative position.

In the drawings wherein like characters of reference indicate like or similar parts throughout the several views, A designates a drive shaft upon which is mounted the usual fly wheel B and a loose pulley C. Secured as at 1 to the edge of the flange of the loose pulley is a plate 2 preferably having an open squared center, the purpose of which will hereinafter appear. Keyed as at 3 to the shaft A and inclosed within the flange of the loose pulley C and in spaced relation to the plate 2 is a circular plate 4 to which are pivoted as at 5 a plurality of wedge elements 6 having a curved upper face 7, and adjustably secured through the medium of screw-threaded thrust rods 8 carrying turnbuckles 9 to a sleeve 10. These rods are each pivoted at one end to a wedge and at its other end to sleeve 10.

The sleeve 10 has a longitudinal groove 11 communicating with its bore for receiving a key or lug 12 on the shaft A to cause the sleeve to rotate with the shaft A while permitting of sliding of the sleeve relative to the shaft to throw in the clutch.

Attention is called to the fact that the lug 12 serves also to key the plate 4 to the shaft—in this connection the lug may be slightly beveled to effect the necessary gripping action.

Furthermore, an annular groove 13 in the sleeve 10 is designed to receive the yoke of a suitable clutch lever 14 for moving the sleeve 10, which on account of the fact that it is connected by the rods 8 to the wedge elements 6 will move them about their pivots 5. Resting upon the upper faces of the wedge elements 6 and located between the plate 2 and circular plate 4 are a plurality of substantially wedge shaped shoes 15 for bindingly engaging the under face of the flange of the pulley C when the clutch is thrown in. Coil springs 16 engaging the forward ends of the shoes and the rear ends of the wedges retain the shoes normally in their forwardmost position so that upon releasing the clutch slight forward movement of the shoes will be effected to facilitate breaking frictional engagement therebetween.

In operation upon moving the sleeve 10 inward the pivoted thrust rod will straighten and cause the wedges 6 to force the shoes 15 outward into binding engagement with the under surface of the flange of the loose pulley C as shown in Fig. 2 and as the stress is increased they will more tightly bind against each other and against the flange to prevent possible loss of power. Upon throwing out the clutch the wedges will be disengaged from the shoes and the springs 16 will then draw the shoes to their most forward position to release the pulley. Furthermore should slight wear take place between the wedges and the shoes this may be taken up by lengthening the adjusting rods 8 through the medium of the turnbuckles 9. Obviously such adjustment will generally be unnecessary on account of the peculiar disposition and configuration of the wedges and shoes as adapted to compensate for wear therebetween.

Attention is particularly called to the fact that the clutch is positive and furthermore that it is simple in construction and can be very readily applied to conventional types of pulleys for one way drive, and also that the clutch elements are for the most part automatically adjustable.

In the event that the clutch is desired to be used as a means for effecting transmission of power from a drive to a driven element such as a driven shaft, the pulley is rigidly mounted on the end of the driven shaft as illustrated in Figure 3 the operation of which is obvious.

By cutting away the central partion of the plate 2 access can be gained to the clutch elements without disassembling the entire mechanism and furthermore the plate in addition to retaining the shoes 15 in position prevents accumulation of dust and dirt thereupon.

From the foregoing description taken in connection with the accompanying drawings, it is thought that a clear and comprehensive understanding of the construction, operation, and advantages of the invention may be had, but while I have shown and described the device as embodying a specific structure, I desire it to be understood that such changes may be made in said structure, as do not depart from the spirit and scope of the invention as claimed.

What I claim is:

1. In a friction clutch, the combination with a drive element and a driven element having a plate thereon, of a sleeve slidably mounted for rotation with the drive element, wedge shaped shoes movably mounted between the drive element and driven element, pivoted wedges connected with the sleeve for engaging the shoes to transmit power from the drive to the driven element, the engaging faces of said shoes and wedges being tapered in opposite directions, a screw adjusting rod between the sleeve and each wedge and pivoted at opposite ends to said sleeve and wedge respectively to form a thrust rod connection for adjusting the degree of contact between the wedges and shoes, and said plate on the driven element adapted to retain the shoes in position and prevent accumulation of dust thereon.

2. In a friction clutch, the combination with a drive shaft and a loose pulley having a plate thereon, of a sleeve slidably mounted for rotation with the drive shaft, a plate on the drive shaft, wedges pivoted at one end to the plate, shoes mounted between the wedges and the flange of the loose pulley for engaging said flange to transmit power thereto from the drive shaft, adjustable thrust rods connecting the free ends of the wedges with the sleeve to adjust the same with respect to the shoes, springs connecting the pivoted ends of the wedges with the opposed ends of the shoes to draw the shoes to their initial position when released, said plate being adapted to retain the shoes in position and protect them from dust and the like.

3. In a clutch of the class described the combination of a drive member and a driven member, the latter having a laterally extending flange, a disk-like plate centrally mounted on said drive member, a sleeve mounted to slide on said drive member, a plate carried by said flange in advance of said first mentioned plate, wedge-shaped shoes arranged in the space between said plates with their outer faces adapted to engage said flange when the clutch is in operative position, wedges pivoted at one end on said first mentioned plate with their outer faces and the inner faces of the shoes shaped to conform and adapted to interlockingly engage whereby the shoes are forced into gripping engagement with the flange, and thrust rods pivotally connected at one end to said sleeve and at their other ends to the free ends of said wedges, whereby the inward movement of the sleeve will force the wedges into engagement with the shoes and connect the driving with the driven member.

In testimony whereof, I affix my signature hereto.

ARTHUR H. HUNT.